(12) United States Patent
Fenton et al.

(10) Patent No.: US 7,340,656 B2
(45) Date of Patent: Mar. 4, 2008

(54) METHOD AND APPARATUS FOR PROBING A COMPUTER BUS

(75) Inventors: James M. Fenton, Tigard, OR (US);
Kevin Taylor, Beaverton, OR (US);
Gene L. Markozen, Tigard, OR (US)

(73) Assignee: Tektronix, Inc., Beaverton, OR (US)

( * ) Notice: Subject to any disclaimer, the term of this patent is extended or adjusted under 35 U.S.C. 154(b) by 314 days.

(21) Appl. No.: 10/888,641

(22) Filed: Jul. 8, 2004

(65) Prior Publication Data

US 2005/0010845 A1  Jan. 13, 2005

Related U.S. Application Data

(60) Provisional application No. 60/485,930, filed on Jul. 8, 2003.

(51) Int. Cl.
*G01R 31/28* (2006.01)
*G01R 31/02* (2006.01)
*G06F 11/00* (2006.01)

(52) U.S. Cl. .................. 714/724; 714/798; 714/56; 324/754

(58) Field of Classification Search .................. 714/56, 714/724, 700, 707, 814, 815, 798
See application file for complete search history.

(56) References Cited

U.S. PATENT DOCUMENTS 4,477,775 A * 10/1984 Fazekas ...................... 324/751
6,446,249 B1 * 9/2002 Wang et al. ................... 716/17
6,539,535 B2 * 3/2003 Butts et al. .................... 716/17
6,687,865 B1 * 2/2004 Dervisoglu et al. ......... 714/726
2006/0064615 A1 * 3/2006 Dervisoglu et al. ......... 714/726

FOREIGN PATENT DOCUMENTS

EP           244926 A    * 11/1987

* cited by examiner

*Primary Examiner*—Cynthia Britt
(74) *Attorney, Agent, or Firm*—Thomas F. Lenihan

(57) ABSTRACT

The subject invention facilitates the efficient operation of the disassembly of the microprocessor bus by providing an apparatus and method for detecting and correcting a strobe phase inversion and predrive filtering in a 2× source synchronous data transfer bus. Apparatus according to the subject invention detects a data strobe inversion in a source synchronous 2× data bus and corrects for this inversion by reordering the received data as well as filtering predrive effects in real time. Specifically, this apparatus according to the subject invention monitors bus traffic in a multiprocessor environment and correctly captures all double data rate exchanges regardless of the source IC or destination IC in the system.

9 Claims, 20 Drawing Sheets

METHOD AND APPARATUS FOR PROBING A COMPUTER BUS

CLAIM OF PRIORITY

The subject application claims priority from U.S. Provisional Patent Application Ser. No. 60/485,930, attorney docket number 7719-US0 METHOD AND APPARATUS FOR STROBE PHASE INVERSION DETECTION AND CORRECTION (Fenton, et al.), filed 8 Jul. 2003.

FIELD OF THE INVENTION

The subject application generally concerns the field of probing a computer bus with a logic analyzer probe, and specifically concerns an apparatus and method for more accurately acquiring data from a high-speed computer bus.

BACKGROUND OF THE INVENTION

When investigating the operation of a computer architecture (i.e., troubleshooting or debugging the system hardware or software), it is commonplace for an engineer to employ a logic analyzer to capture data traffic on the system bus. This may be done by unplugging an IC processor from its socket, plugging in a probe adapter, and reinstalling the processor in a socket of the probe adapter. In this way, the logic analyzer gets access to the system (i.e., computer) bus without disabling the operation of the device under test (DUT).

Modern computers require high-speed communication between such integrated circuits (i.e., IC's or "chips") residing on a bus. This high-speed communication entails bidirectional data transfers on the order of 400 Mb/s (Megabits per second) or greater per channel. Data, clock, and strobe signals are usually sent from a source IC to the destination IC to accomplish these data transfers.

At these high data rates, UHF RF (ultra high frequency radio frequency) circuit board design rules apply to the physical layout of the computer bus. At these RF frequencies, the physical length of a bus line affects the "flight time" of the signals from a source IC to a destination IC. Therefore, under such rules, the physical length of each clock, data, and strobe line is carefully assigned to ensure that the signals arrive at the destination IC with the proper timing relationship.

Because the above mentioned probe adapter is plugged into a single fixed IC processor location, it follows that signals sent to that location will be received by the logic analyzer probe with the proper timing relationship. However, these timing relationships may be violated when the processor in the probe adapter drives the bus. Under these conditions, the aforementioned timing relationships (bus latency) do not hold.

A logic analyzer monitoring bus traffic faces yet another signal timing problem. Some microprocessor buses implement a technique known as strobe phase reversal. The following brief explanation may be helpful in understanding this problem.

In order for microprocessor vendors to increase the throughput of data transfer on microprocessor buses, the rate at which data is presented on the bus must be increased. One method to do this is to increase the number of times data is presented on the bus in one clock cycle. In order to better control the timing and latching of this data, separate data strobes are provided that can be used as data login latch signals to latch the data as they are presented on the data bus.

FIG. 1 shows an example of a normal data transfer. In this example, data is transferred once in one clock cycle. The timing of the data is referenced to the clock signal. While this transfer method has been widely used, it tends to be too slow for today's high-speed applications.

In a source-synchronous system, data is output two or more times during one clock cycle, thus increasing the data throughput by a factor of at least two. FIG. 2 is an example of a 2× data bus transfer. In this example, data is transferred twice during one clock cycle. The timing of the strobe is centered in the data valid window. Although the data timing is referenced to the strobes, the data is eventually synchronized to the clock signal at a later time by the receiving device. Such a bus is known from the Itanium® computer bus architecture, developed and manufactured by Intel Corporation, Hillsboro, Oreg.

As can be seen in FIG. 2, two strobes are employed in this system, STBp and STBn. Strobes STBp and STBn are pseudo-differential signals, as opposed to true differential signals, in that strobes STBp and STBn can assume an idle state in which both signals are at a high logic level. In the example of FIG. 2, the falling edge of the strobe signal STBn is used to latch DATA 1, DATA 3, and DATA 5. The falling edge of strobe signal STBp is used to latch DATA 2, and DATA 4. In other words, strobe STBn is used to latch the odd data transfers, and strobe STBp is used to latch the even data transfers. Thus, the data transfer scheme of FIG. 2 effectively doubles the data transfer rate with respect to the scheme used in FIG. 1.

After the processor finishes transferring data (i.e., "driving" the bus), it must release the bus for use by others. Following the transfer of DATA 5, there is a period 210 during which there is no valid data on the bus. Releasing the bus is accomplished by providing a positive-going "post-drive" transition 220 on whichever strobe (STBp or STBn) happens to be in its low logic level state, to drive it to the high logic level state. The strobes STBp and STBn are now both at a high logic level indicative of the idle state mentioned above.

In some microprocessor systems employing this 2× mode data transfer technique, the polarity of the strobes can be reversed between data transfer cycles. The purpose of this strobe polarity reversal is to reduce the latency between data transfers. FIG. 3 shows an example of an occurrence of a strobe phase reversal on the bus, and an example of a strobe state in which a processor is maintaining control of the bus.

Referring to FIG. 3, during period 310, there is no valid data on the bus. However, the processor currently in control of the bus wishes to retain control. The processor keeps control by maintaining common clock control signals in their present states which results in strobes STBp and STBn being maintained in their respective present states at points 315 318. Note that the strobes are in their proper states to enable the latching of DATA 1 without delay.

After the completion of the transfer of DATA 2, there is no valid data on the bus (i.e., during period 330), and the processor releases the bus by providing a positive-going post-drive transition on Strobe STBn at point 338. At point 340, a different processor provides a negative-going pre-drive transition on Strobe STBp. This pre-drive transition places the strobes into the differential relationship with respect to one another in preparation for latching the next valid data (DATA 1' in this example). It is important to note that since data capture is controlled by negative-going edges of the strobes, the predrive transition causes an erroneous acquisition of invalid data.

Note that a strobe phase reversal has occurred. Before the strobe phase reversal had occurred, the falling edge of STBp had been associated with the odd data transfers and the falling edge of STBn had been associated with the even data transfers. After the strobe phase reversal occurred, the falling edge of STBp became associated with the even data transfers, and the falling edge of STBn is now used to latch the odd data transfers.

If a microprocessor probe is latching this data into memory devices such as flip-flops, a strobe phase reversal will cause the data to be presented to the Logic Analyzer in a swapped order and may also result in an extra data sample. One may think that a good solution to this problem would be to program the Logic Analyzer to reorder the data. However, this solution is undesirable for at least three distinct reasons. First, this solution puts an extra burden on the disassembly software in the Logic Analyzer to reorder the data whenever a strobe phase inversion takes place. In such a system, inverse assembly software manipulates the data based on stored flag information to determine when a strobe phase reversal had occurred. This extra burden causes a significant increase in the time it takes the microprocessor disassembly software to present to the user the transactions that are occurring on the data bus. Second, this solution doesn't store the data as it was transferred across the bus. Third, this solution operates in a post-processing mode; it does not operate in real time. Since triggering must occur in real time, using this scheme would make it difficult, if not impossible, to trigger on data affected by such a strobe phase reversal.

What is needed is a logic analyzer probe apparatus and method that resolves any observed improper timing relationships and properly acquires substantially all bus transactions even when a phase reversal occurs.

SUMMARY OF THE INVENTION

The subject invention facilitates the efficient operation of the disassembly of the microprocessor bus by providing an apparatus and method for detecting and correcting a strobe phase inversion in a 2× source synchronous data transfer bus. Apparatus according to the subject invention detects a data strobe inversion in a source synchronous 2× data bus and corrects for this inversion by changing the order of the received data and removes extra samples associated with PreDrive in real time. Specifically, this apparatus according to the subject invention monitors bus traffic in a multiprocessor environment and correctly captures all double data rate exchanges regardless of the source IC or destination IC in the system.

DETAILED DESCRIPTION OF THE EMBODIMENTS

Figure 1:
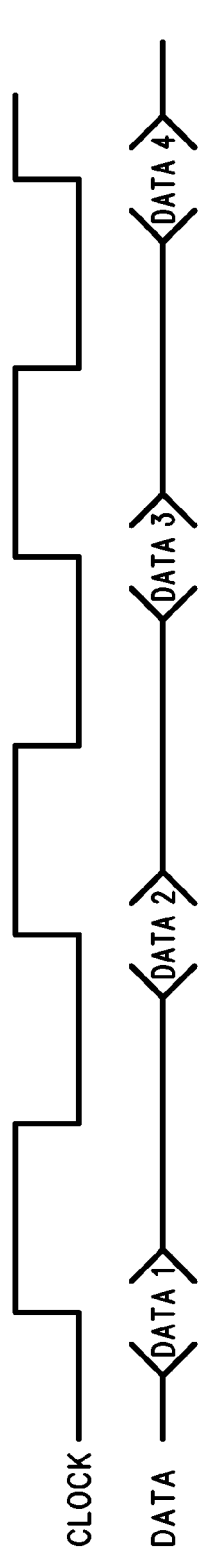
FIG. 1 shows timing diagrams useful for understanding a 1× transfer as known from the prior art.
Figure 2:
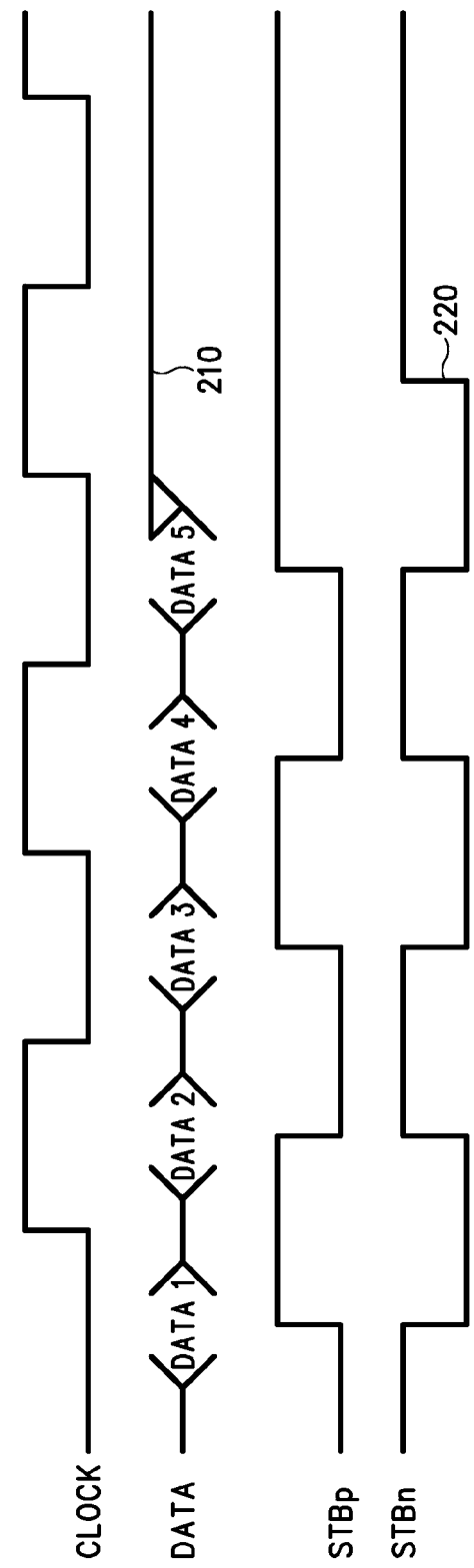
FIG. 2 shows timing diagrams useful for understanding 2× transfer as known from the prior art.
Figure 3:
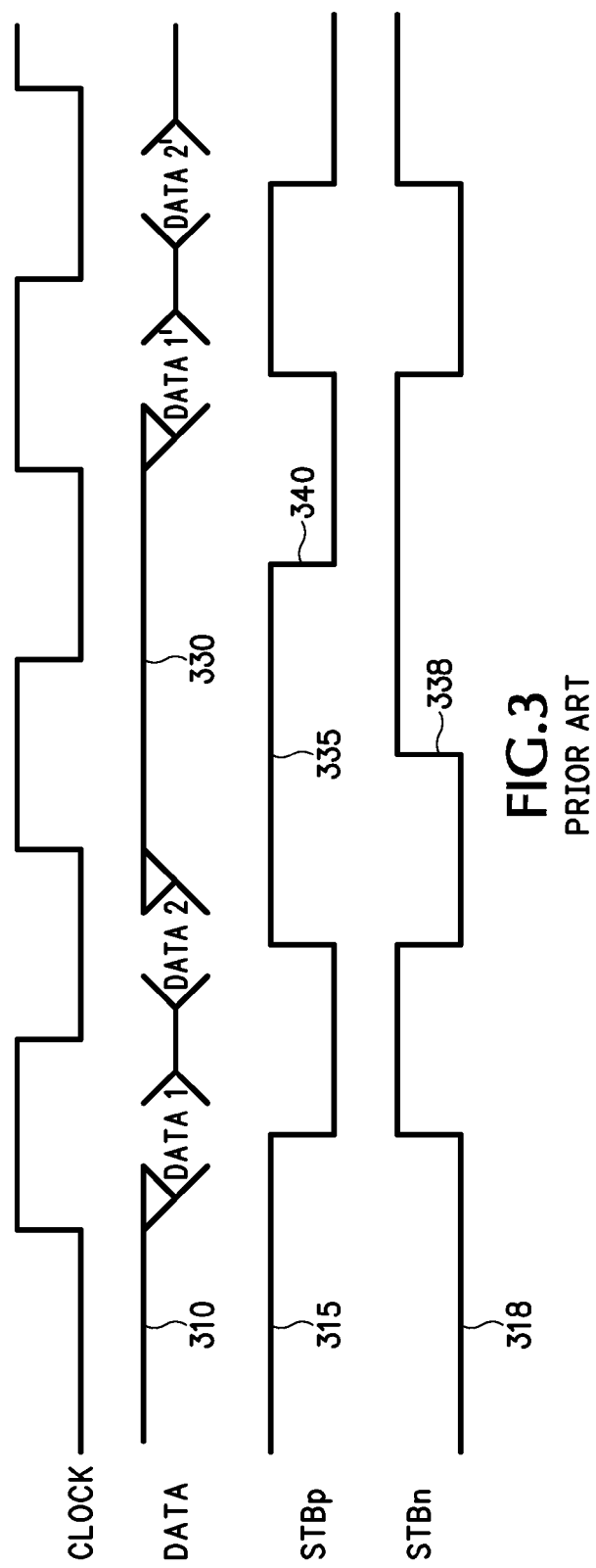
FIG. 3 shows timing diagrams useful for understanding a strobe phase reversal as known from the prior art.
Figure 4:
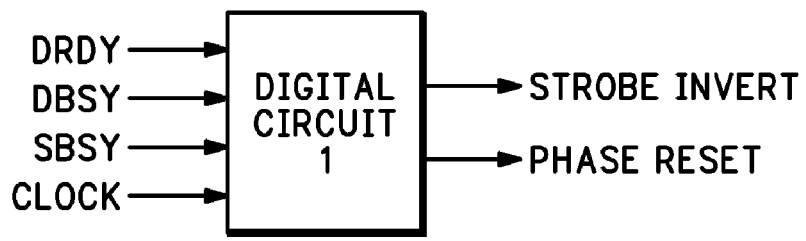
FIGS. 4, 5, and 6 show, in block diagram form, a Strobe Phase Shift Detection and Tracking Circuits in accordance with the subject invention.
Figure 5:
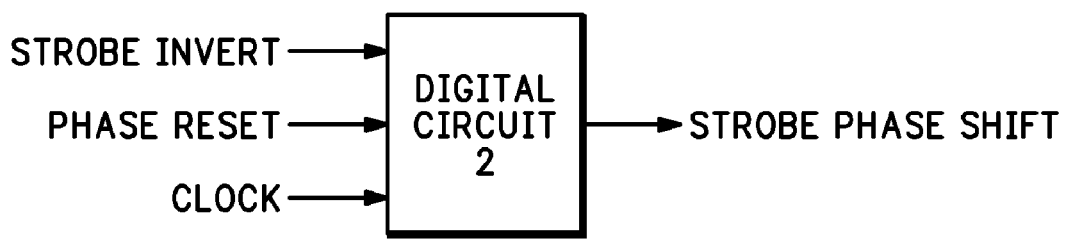
Figure 6:
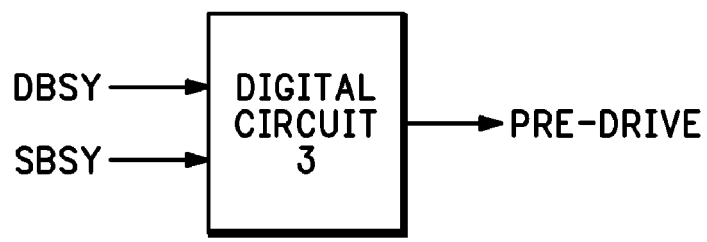

In order to detect that a strobe phase inversion has taken place, it is necessary to monitor specific control signals on the data bus that identify when the inversion will occur. These control signals, based on a certain sequential pattern, will identify when the data strobes will change phase. FIGS. 4, 5, and 6 show, in block diagram form, circuitry that is capable of detecting when a strobe phase inversion takes place, and tracks predrive condition for the next data transfer. The terms "strobe phase reversal", "strobe phase shift" and "strobe phase inversion", as used herein, have the same meaning, and are used interchangeably.

Referring to FIG. 4, control signals are montored by Digital Circuit 1, sequentially clocked by the main bus clock. When a certain sequence of events occurs on the control signals, the digital circuit will assert either the Strobe Invert signal or the Phase Reset signal. The sequence of events to determine whether to assert the Strobe Invert or the Phase Reset signal may differ from one kind of microprocessor to another. The two signals, Strobe Invert and Phase Reset are connected to the Strobe Phase Tracing circuit, which is discussed next.

Digital Circuit 3 of FIG. 6 is responsive to a DATA BUSY (DBSY) signal and to a STROBE BUSY (SBSY) signal for generating a PRE-DRIVE signal.

Figure 11:
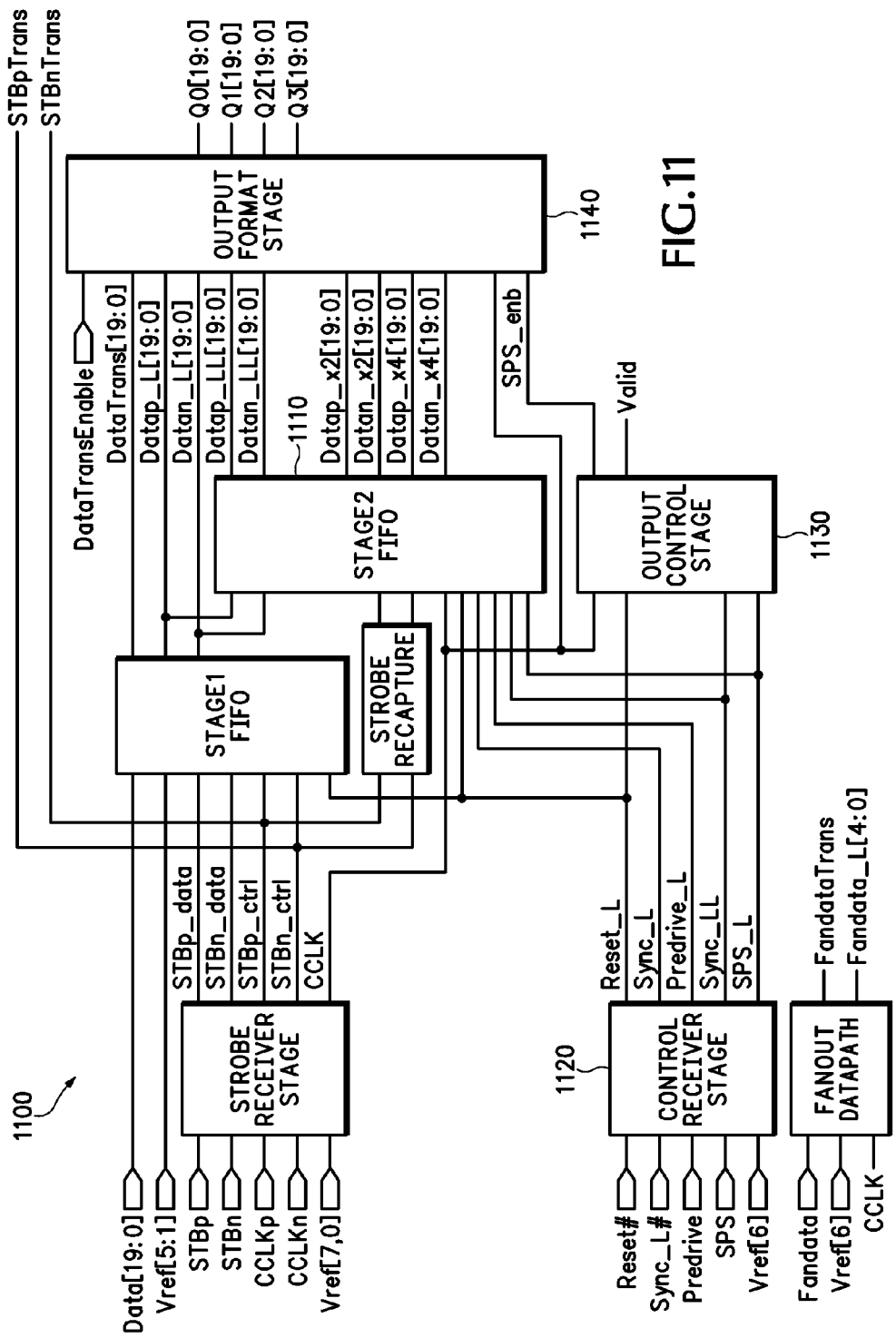
FIG. 11 shows, in block diagram form, the BUS CAPTURE ASIC contained within Preprocessor 180 of FIG. 10.

FIGS. 7, 8A, 8B, 9A, 9B, 18A, 18B, 18C, and 18D show a more detailed view of the logic circuits of Digital Circuit 1 of FIG. 4, Digital Circuit 2 of FIG. 5, and Digital Circuit 3 of FIG. 6 for detecting when a Strobe Phase Inversion and PreDrive occurs, and generating the appropriate signal for use by the Strobe Phase Inversion Correction circuit of FIG. 11.

Figure 7:
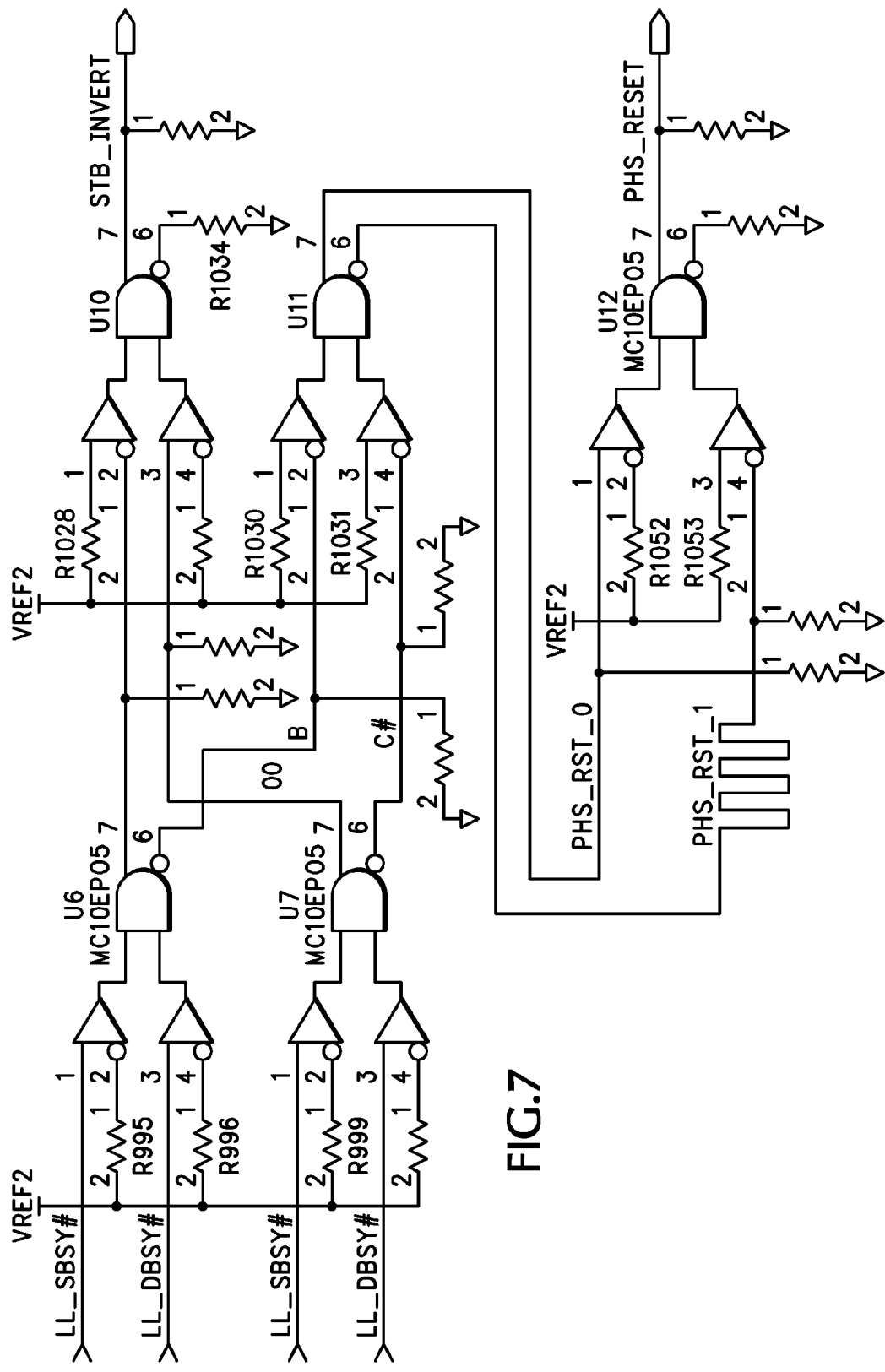
FIGS. 7, 8A, 8B, 9A and 9B show, in schematic form, circuitry for implementing the blocks of FIGS. 4, 5, and 6.
Figure 8A:
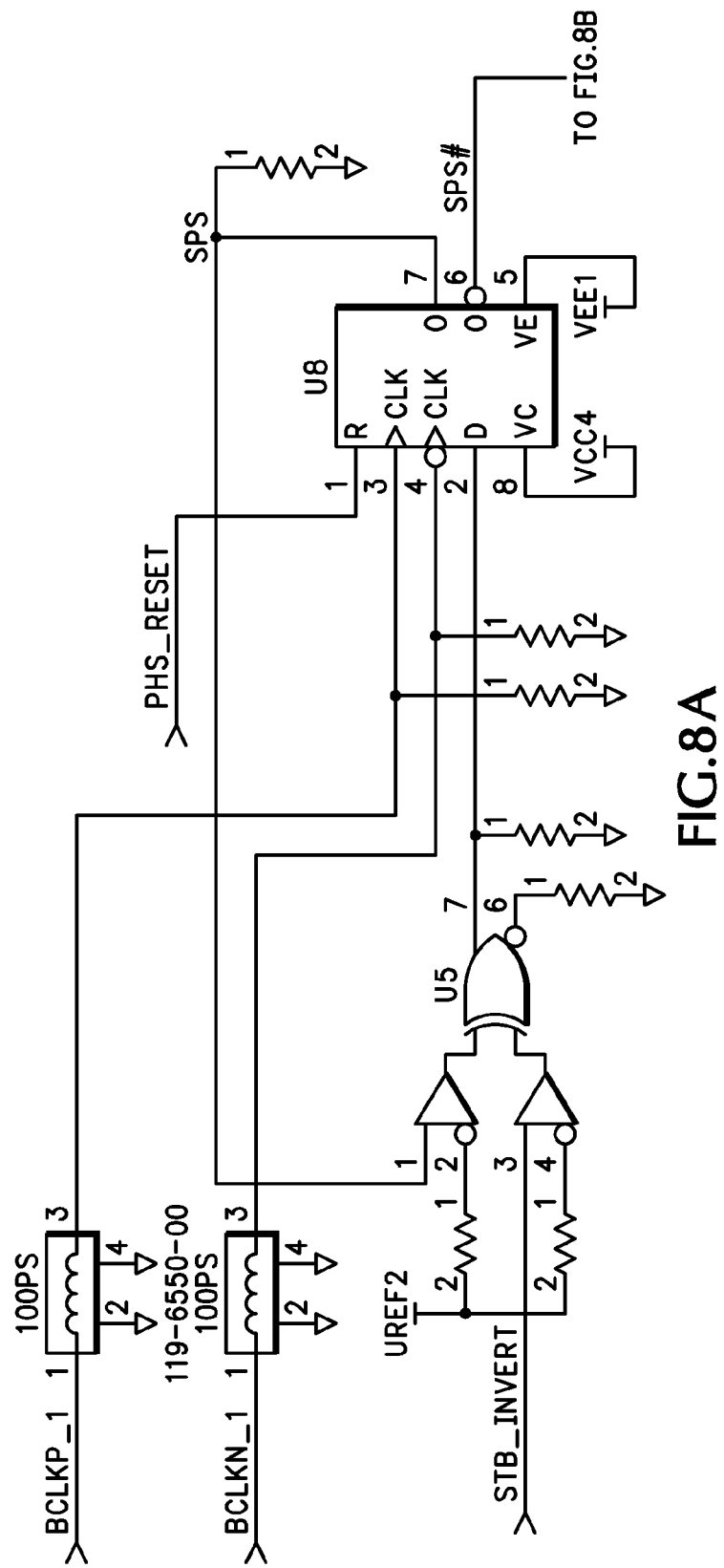
Figure 8B:
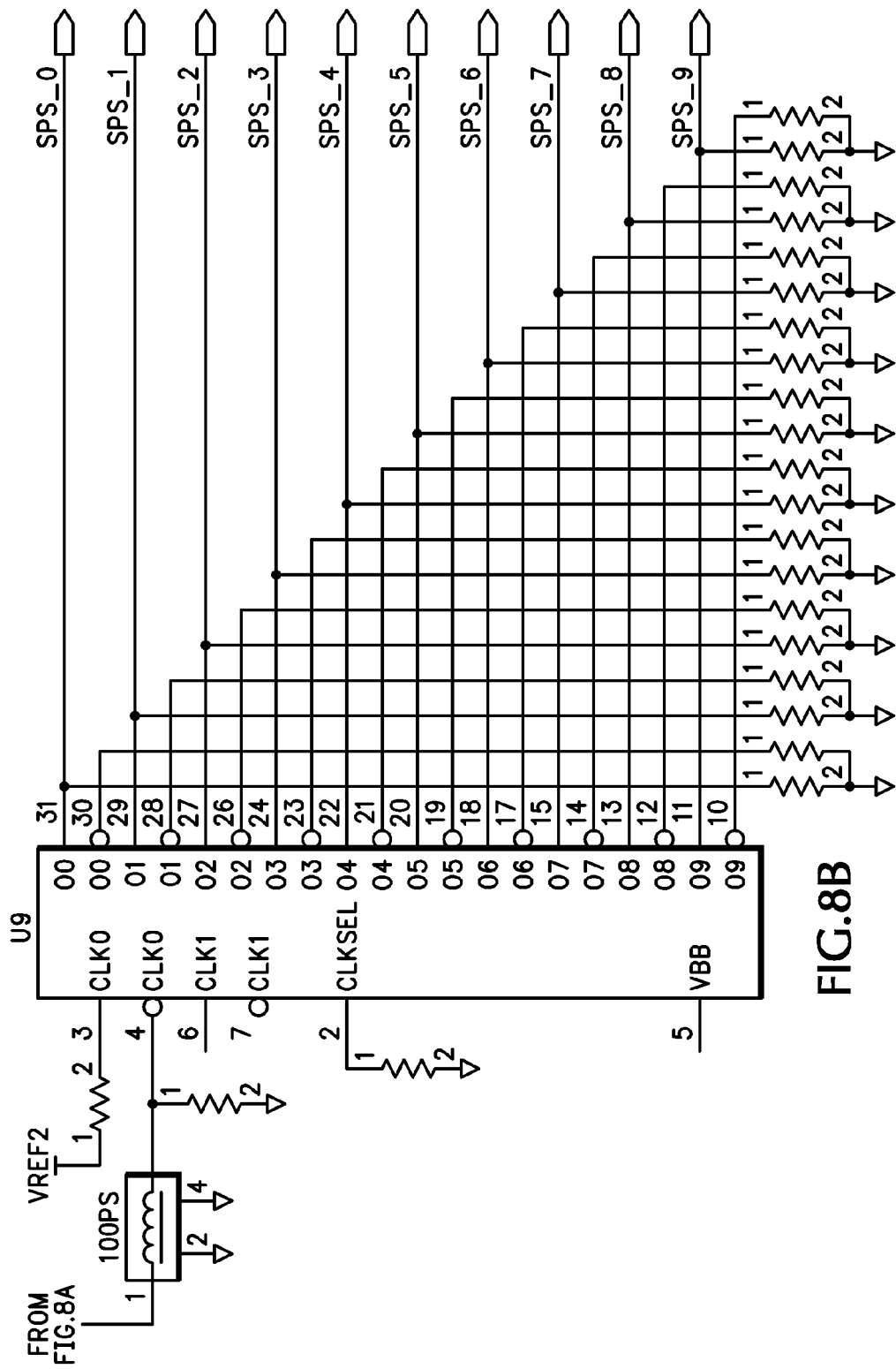

FIG. 7 shows combinatorial logic U6, U7, U10, U11, and U12 for monitoring the state of control signals SBSY, DRDY, and DBSY to determine that a Strobe Phase Inversion is about to occur. The output signals STB Invert and PHS Reset are taken from U10 and U12, respectively. FIGS. 8A and 8B show additional logic circuits U5, U8, and U9 of Digital Circuit 2 of FIG. 5 in greater detail. U5 is a flop-flop for latching the strobe state using the STB Invert and PHS Reset lines. U9 is a distribution chip that buffers the single signal SPS (Strobe Phase Shift) at the output of U8 to provide multiple copies SPS0 to SPS9 to drive data latching correction circuitry.

The Strobe Phase Inversion tracking circuit of FIG. 5 uses the Strobe Invert and Phase Reset signals to track the state of strobe phasing. Digital circuit 2 uses these signals to control the polarity of the differential data login strobes by sending out a Strobe Phase Shift signal. If the strobe phase detect circuit detects that the next data transfer will have a strobe phase inversion, then the Strobe Phase Shift signal will be asserted and the phase of the strobes, used by a logic analyzer preprocessor, to reorder the data. This correction takes place in an Application Specific Integrated Circuit (ASIC) in the above-mentioned pre-processor (to be described in detail below). The differential data login strobes are the clocks used to latch in the data into the flip-flops of the BUS CAPTURE ASIC.

Figure 9A:
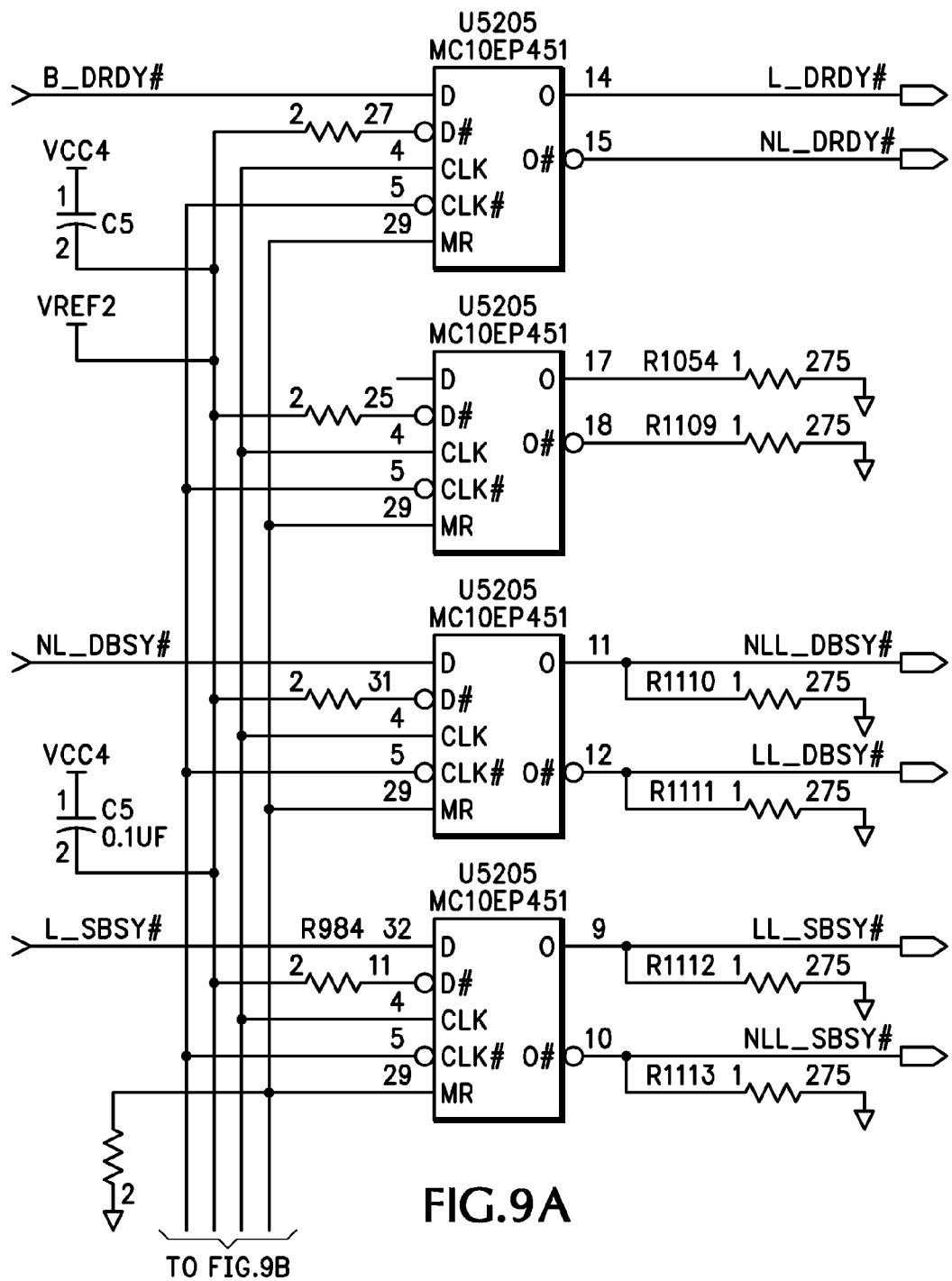
Figure 9B:
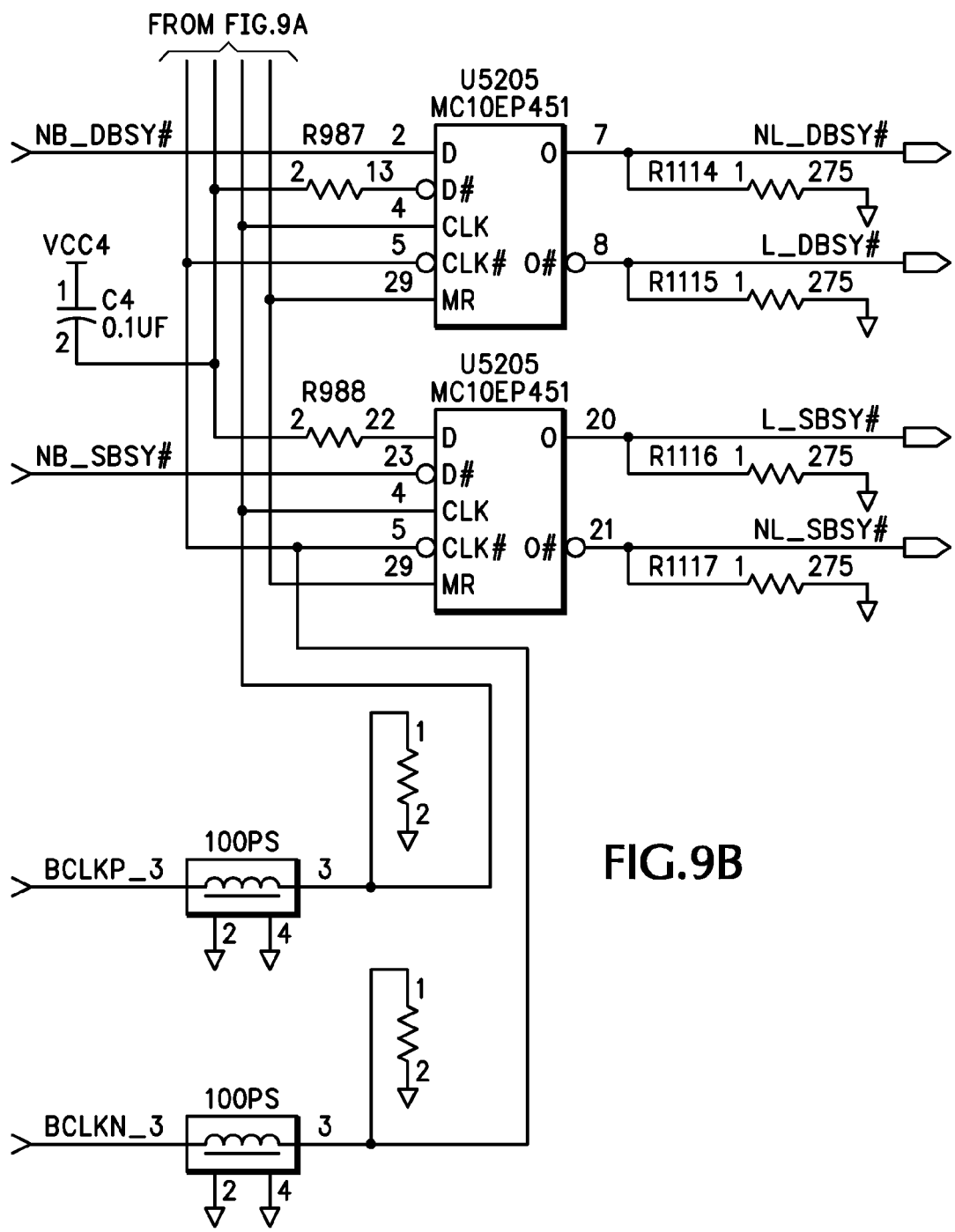

Digital Circuit 2 of FIG. 5 is essentially a T flip-flop that asserts a Strobe Phase Shift assertion based on the Strobe Invert assertion or a Phase Reset assertion. FIGS. 9A and 9B show the logic circuits U5205 (a bank of latches) whose outputs are used in the Digital Circuits of FIGS. 4, 5, and 6.

If the strobe phase detect circuit detects that the next data transfer will not have a strobe phase inversion, then the strobe phase shift signal is deasserted and the differential strobes stay at the current polarity for the next data transfer.

If there is a certain control signal sequence indicating phase reset condition, then the Strobe Phase Inversion Detection circuit detects this condition and asserts the Phase Reset signal. This signal has priority over the Strobe Invert signal. The Strobe Phase Inversion Tracking circuit will reset and either assert or not assert the Strobe Phase Shift signal based on the current polarity of the differential strobes. If the differential strobes are currently not inverted, then the Strobe Phase Shift signal will not be asserted. If the differential strobes are currently inverted, then the Strobe Phase Shift signal will be asserted and the differential strobes will be put in their default polarity condition.

Figure 10:
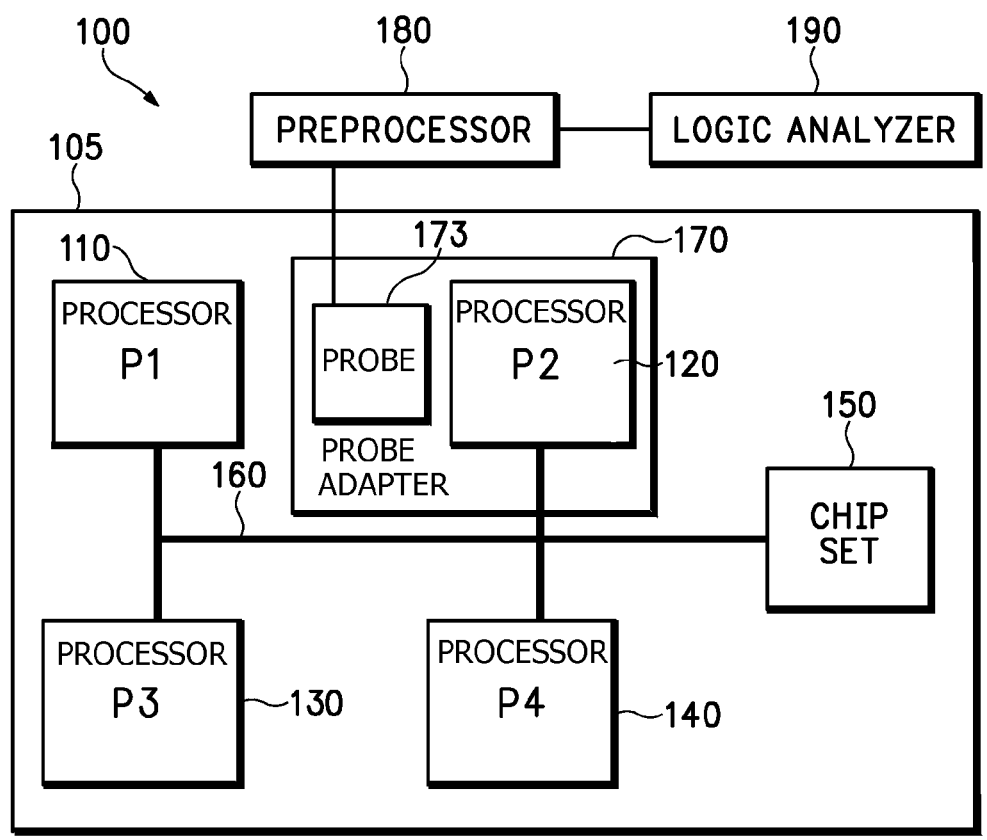
FIG. 10 shows a Logic Analyzer and computer bus architecture suitable for use with the invention.

FIG. 10 shows a simplified arrangement 100 of a Logic Analyzer 190 and computer bus (i.e., Device Under Test or DUT) 105, having four Processor ICs 110, 120, 130, 140. Processor ICs 110, 120, 130, 140 are coupled to "Chip Set" 150 via a system bus (i.e., Front Side Bus) 160 to allow "inter-chip" communication to take place. In this example, Processor 120 has been unplugged from its socket, a Probe Adapter 170 has been plugged in, and Processor 120 has been reinstalled in a socket of Probe Adapter 170. A Probe 173 of Probe Adapter 170 is coupled to Logic Analyzer 190 via a PreProcessor 180 within which the above mentioned strobe phase reversal detection and correction and predrive detection and correction are accomplished. In this way, a Probe 173 of Probe Adapter 170 can passively monitor the signals occurring on the bus during data transfers between the active circuits on the bus.

When a data transfer takes place, the sending processor or chip set sends the data source synchronously to the receiving device. The receiving device uses the data strobes to latch the source synchronous data and resynchronizes it to the master bus clock. All of the processors and the chip set are capable of this operation.

In this source synchronous operation, the receiving device only has to pay attention to the sending device with the time aligned source synchronous data strobes and data. In a number of source synchronous data transfers, there may be a strobe phase inversion. The built-in source synchronous receiver circuitry in the processors and the chip set will be able to correctly handle this strobe phase inversion and correct for it.

Logic analyzer preprocessor 180 correctly detects and corrects for a strobe phase inversion and correctly presents the reordered code of bus (FSB, or Front Side Bus) 160, to logic analyzer 190 no matter under which of Processors 110, 120, 130, 140, probe adapter 170 is physically located.

FIGS. 11–17 will be described together. FIG. 11 shows, in block diagram form, the BUS CAPTURE ASIC, generally designated 1100 and contained within Preprocessor 180 of FIG. 10. Externally generated signals PreDrive and Strobe Phase Shift (SPS) are applied to the Control Receiver Stage 1120. The latched signals SPS_L and Predrive_L are applied to Output Control Stage 1130, and Stage2 FIFO 1110 respectively. Output Control Stage 1130 generates an SPS_ENABLE signal and applies it to an Output Format Stage 1140.

Figure 12:
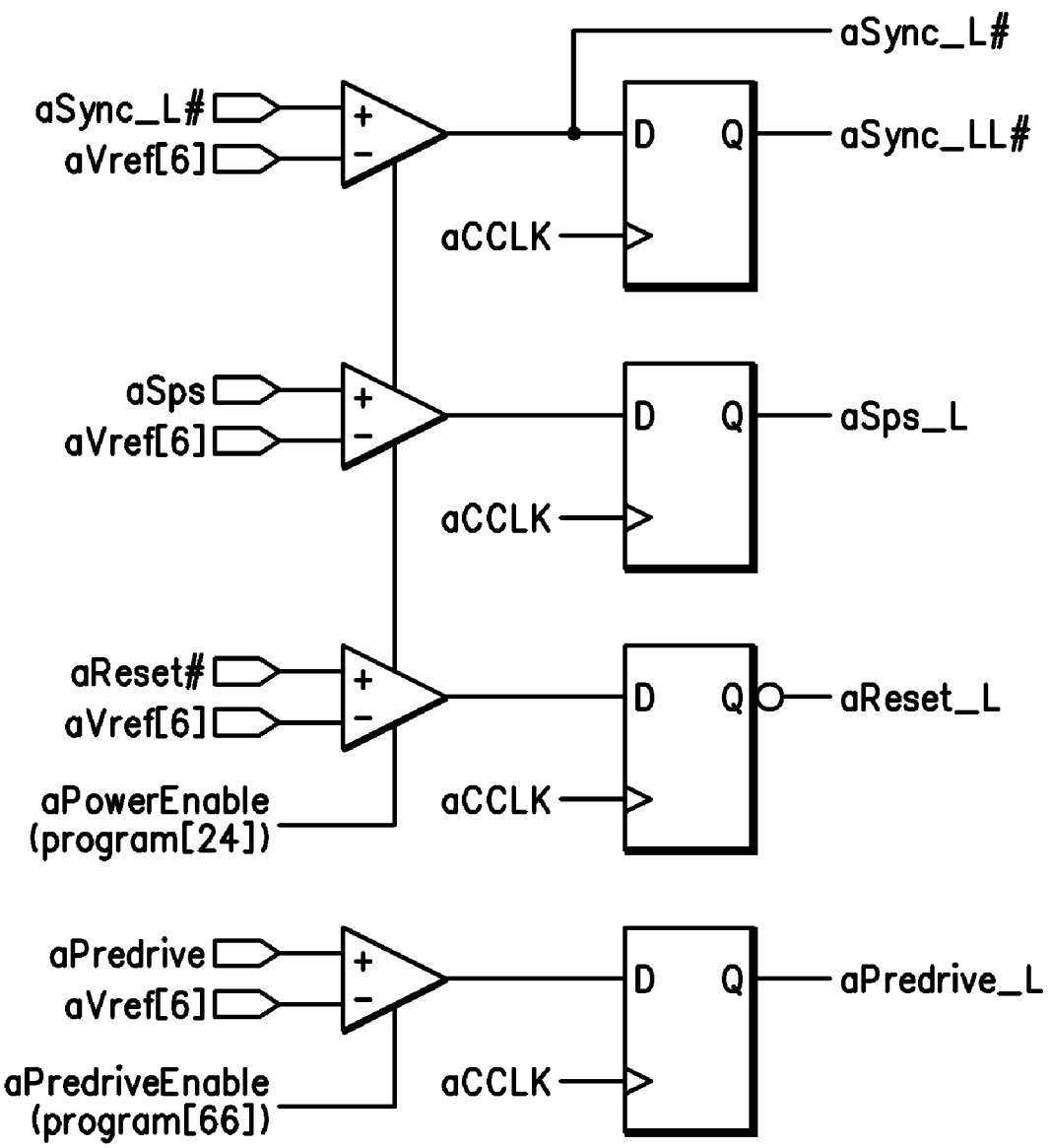
FIGS. 12, 13, 14, 15, and 16 show circuitry contained within BUS CAPTURE ASIC of FIG. 11.

FIG. 12 shows the relevant circuitry of Control Receiver Stage 1120 in detail. Inside Control Receiver Stage 1120, the SPS and PreDrive signals are synchronized to the common clock which is a buffered version of the processor bus common clock of the device under test.

Figure 13:
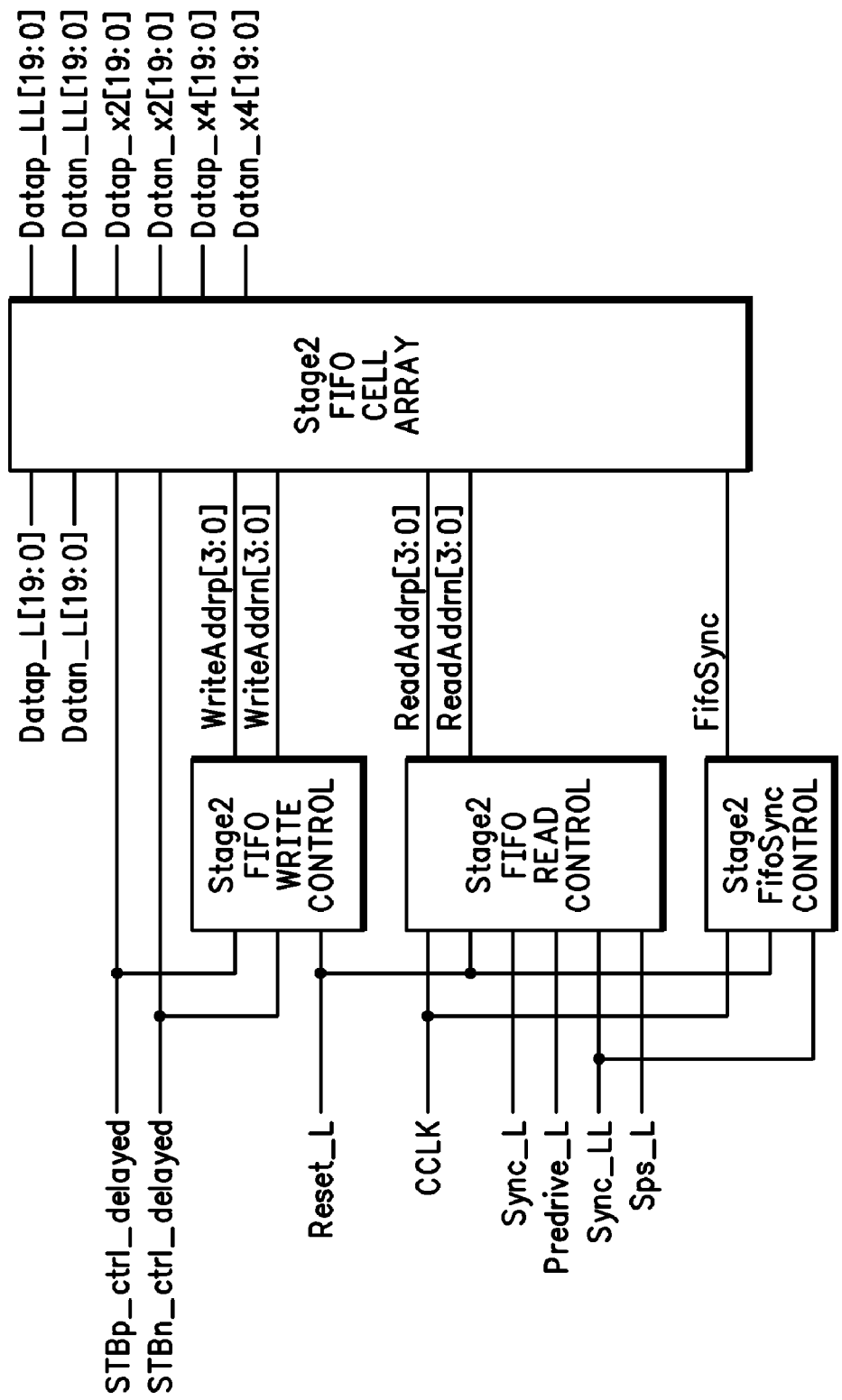
Figure 14:
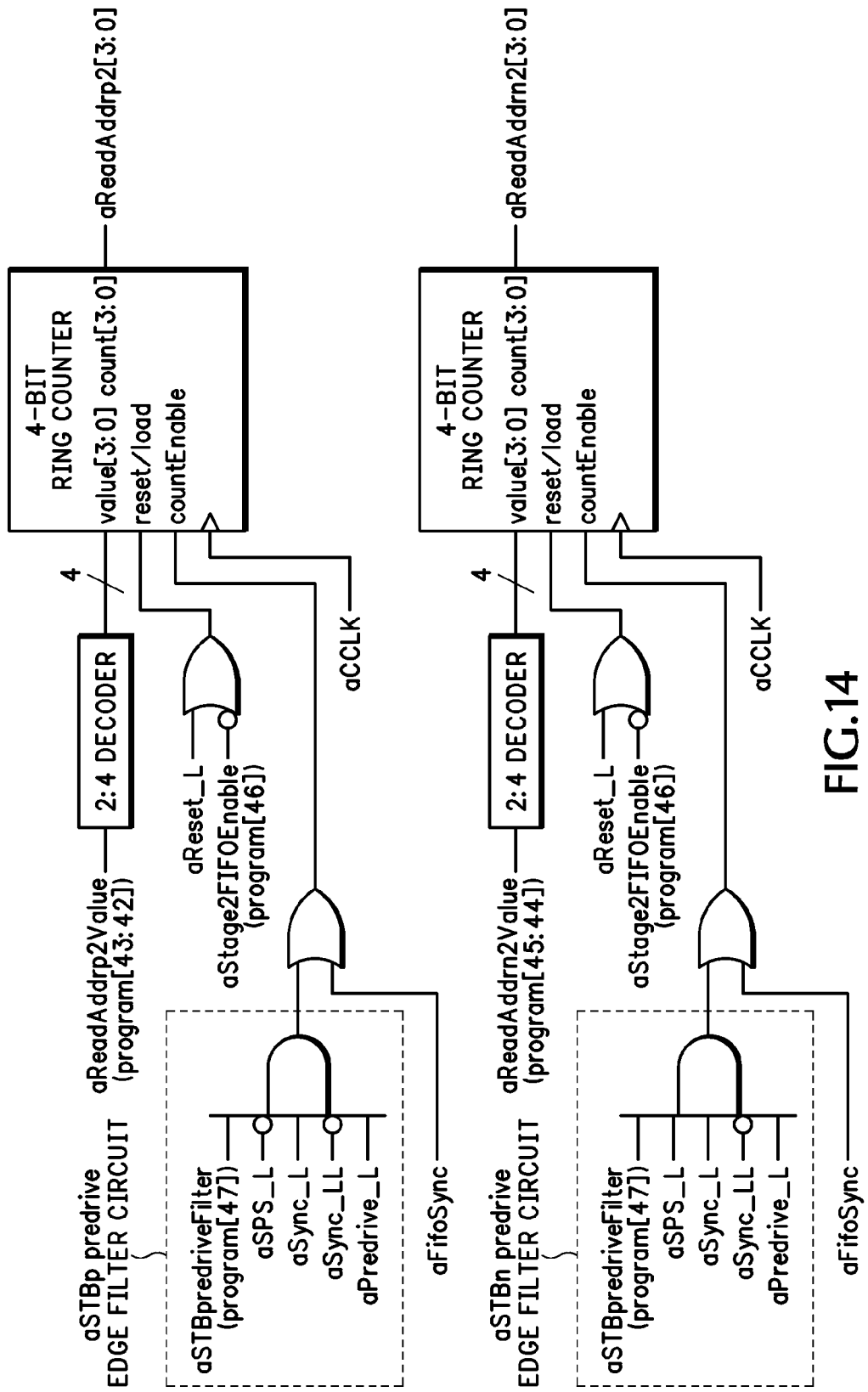

FIG. 13 shows some of the circuitry contained within Stage2 FIFO 1110. Inside Stage2 synchronization FIFO, the PreDrive and SPS soignals are applied to the Stage2 FIFO Read Control block, shown in FIG. 14. In the Stage2 FIFO Read Control block, the SPS and PreDrive signals are applied to an AND gate. The resulting signal is OR'ed with a FIFO Sync signal to produce a Count Enable signal. The Count Enable signal is applied as an input to a 4-bit Ring Counter. The 4-bit Ring Counter provides a pointer address of the output registers to ensure that the correct data is produced, whether or not a predrive transition had occurred. Stage2 FIFO Read Control Block also serves the function of pointer to the acquired data. When a PreDrive transition occurs, the pointer to the data is incremented to point to the correct data, thereby eliminating the erroneous data mentioned above.

Figure 15:
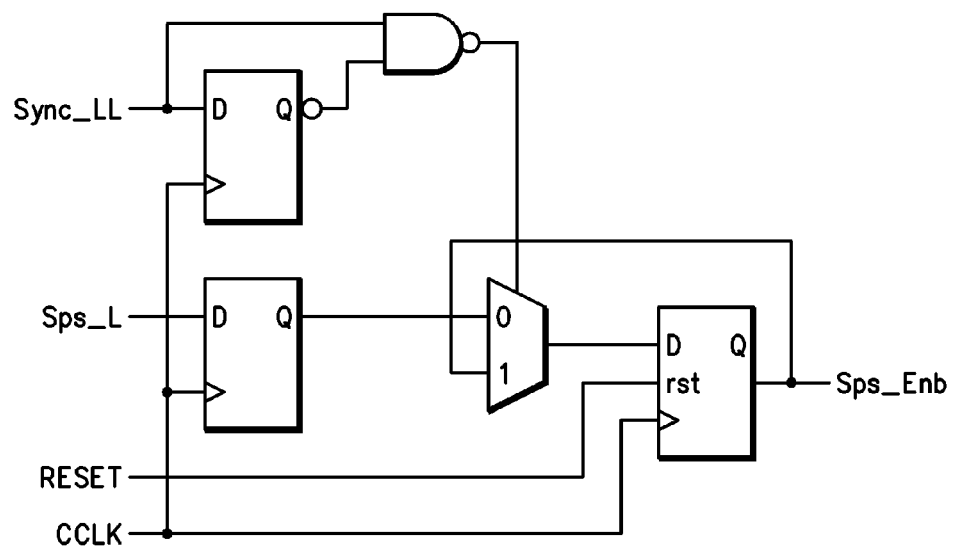
Figure 16:
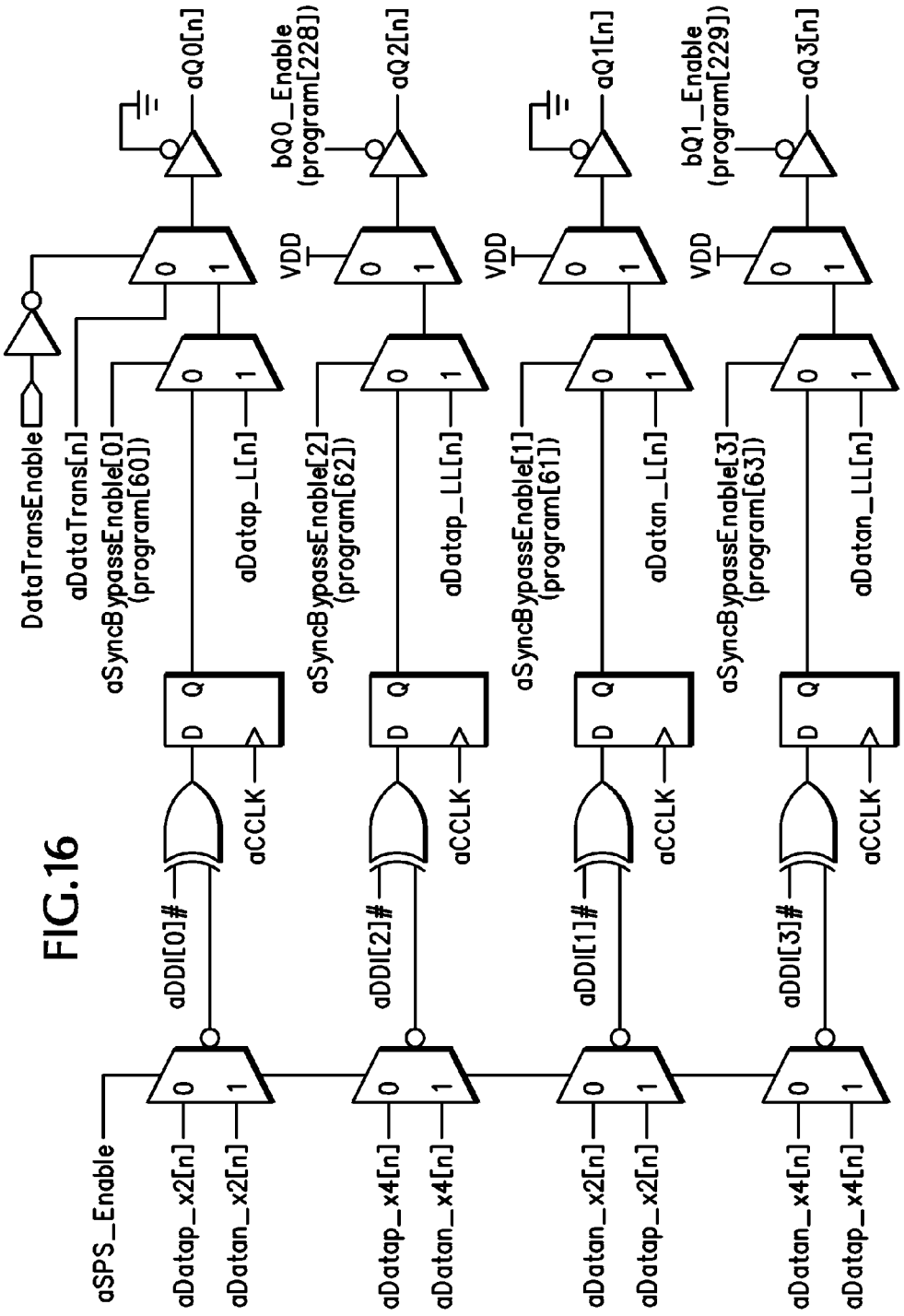

FIG. 15 shows some of the circuitry contained within Output Control Stage 1130. The SPS signal is applied to the Strobe Phase Shift Enable logic of Output Control Stage 1130. The resulting output signal SPS_ENABLE is applied to Output Format Stage 1140, shown in detail in FIG. 16. The SPS_ENABLE signal controls which signals are selected by the multiplexers of FIG. 16 to proceed to the outputs. The effect of this selection is shown in the timing diagram of FIG. 17.

Figure 17:
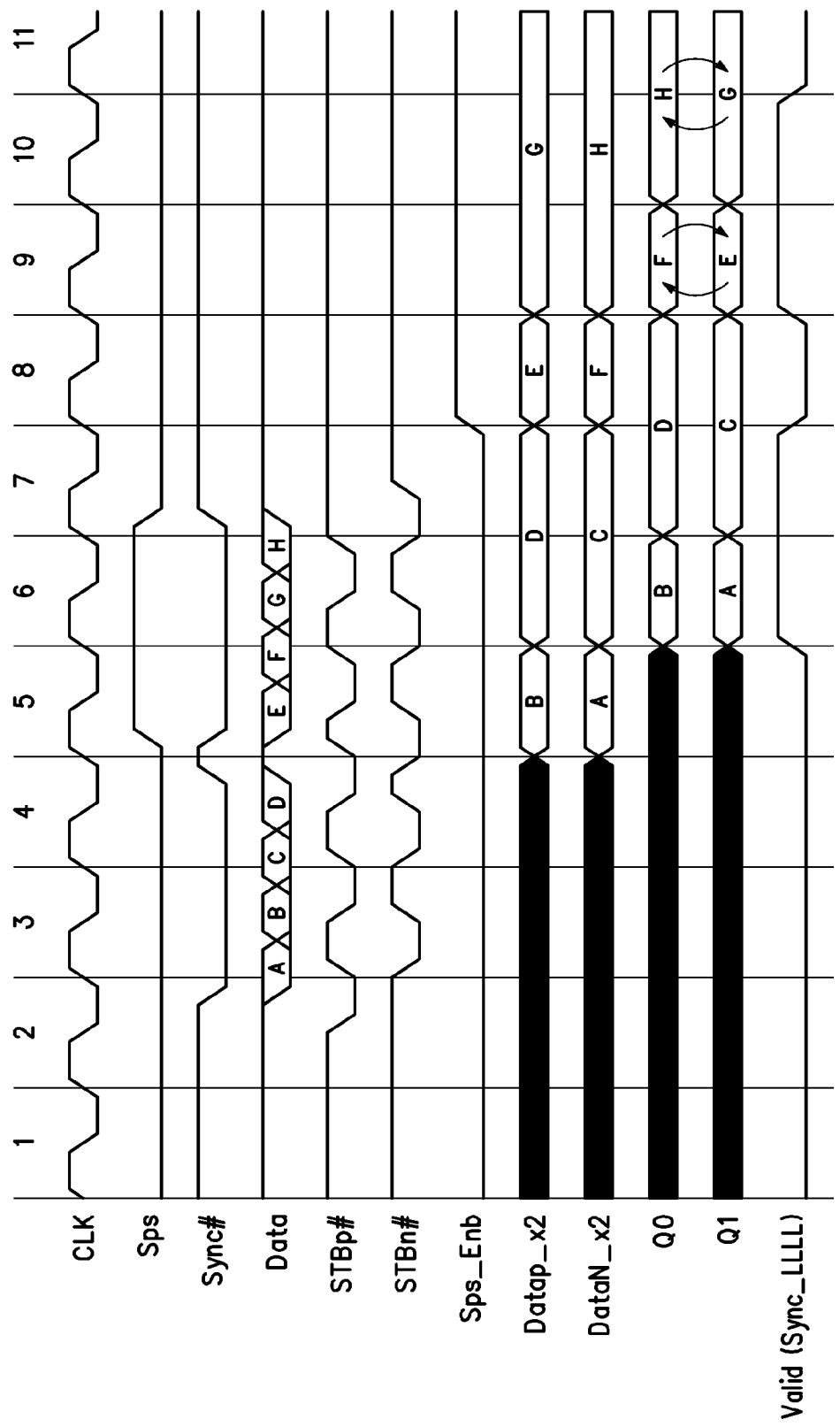
FIG. 17 shows a timing diagram useful for understanding the invention.
Figure 18A:
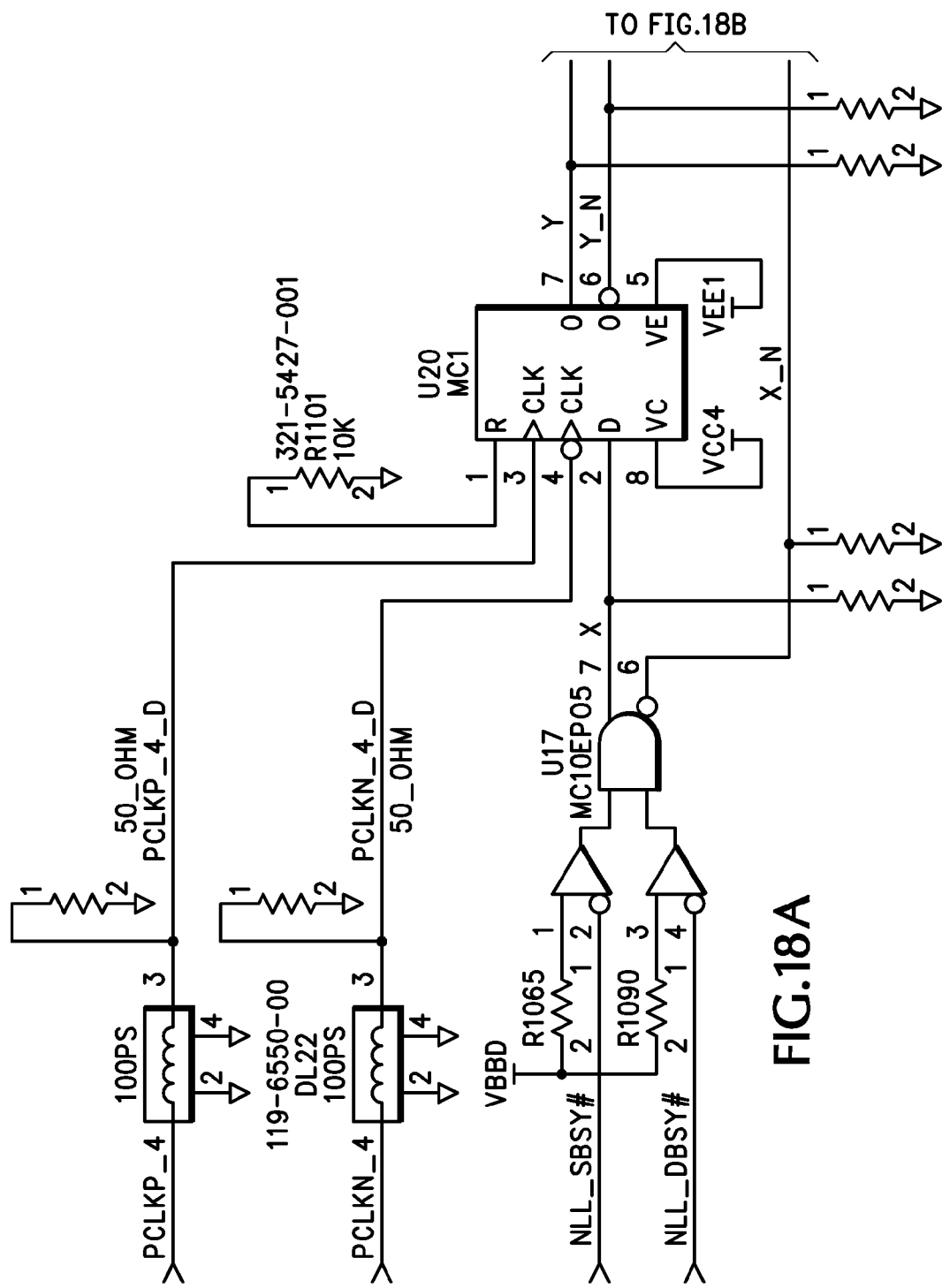
FIGS. 18A, 18B, 18C, and 18D shows the PreDrive circuitry of FIG. 6.
Figure 18B:
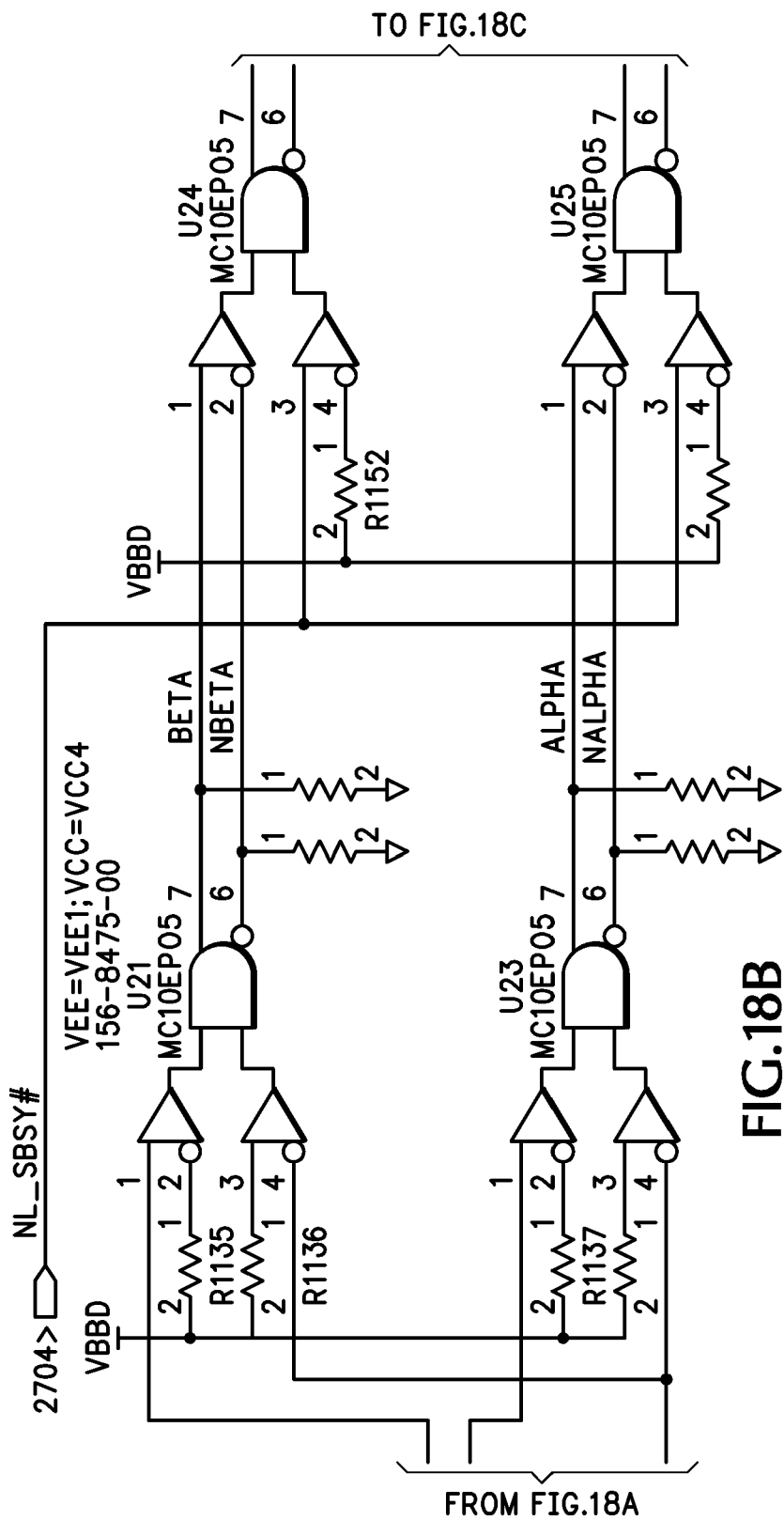
Figure 18C:
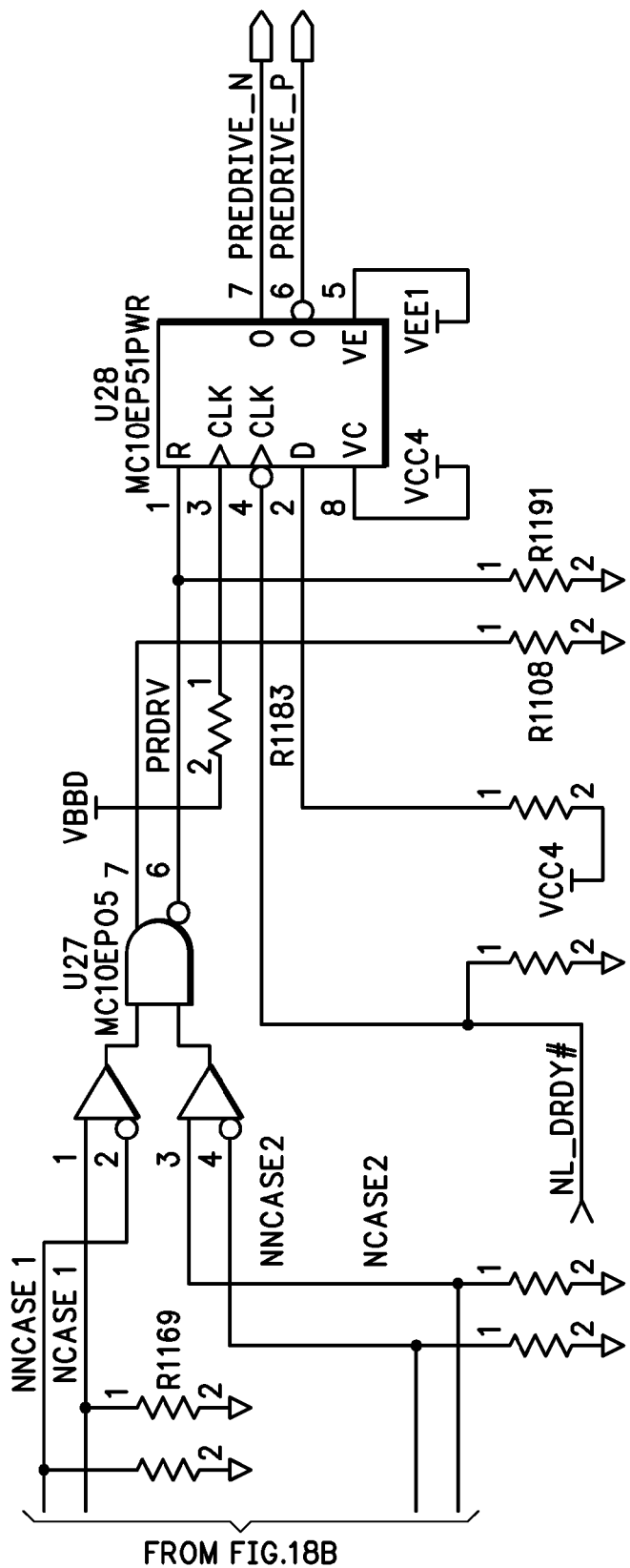
Figure 18D:
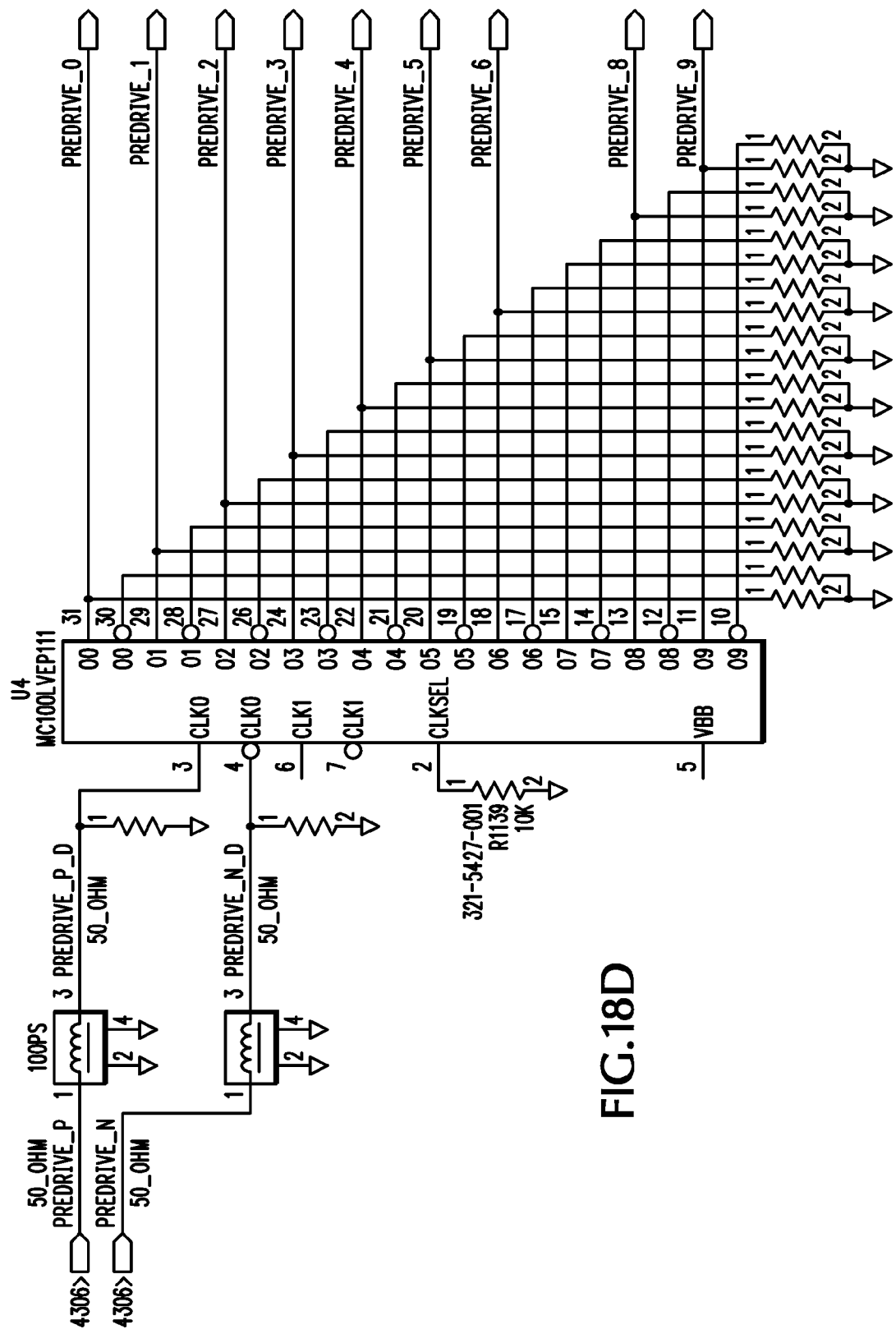

As indicated in the timing diagram of FIG. 17, the SPS_ENABLE signal is used to ensure that the correct order of the data is preserved, even when a strobe phase reversal has occurred. In the diagram of FIG. 17, a strobe phase reversal has indeed occurred, causing the output signals on the Q0 and Q1 outputs to swap places, thereby correcting the order of the affected data.

Although a 2× (i.e., double density) source synchronous bus was used to describe the subject invention, one skilled in the art will recognize that the principles of the invention may be applied to source synchronous buses having a data transfer rate great than 2×.

What has been described is an apparatus and method having:
  The ability to detect a strobe phase inversion is about to take place in a source synchronous data microprocessor bus transfer by monitoring a set of sequentially clocked control signals.
  The ability to correct for a strobe phase inversion in a source synchronous data microprocessor bus transfer by monitoring a set of sequentially clocked control signals.
  The ability to detect a predrive condition is in a source synchronous data microprocessor bus transfer by monitoring a set of sequentially clocked control signals.
  The ability to filter out erroneous data resulting from a predrive condition.
  The ability to enable the microprocessor software disassembly code to efficiently readback the correctly stored in-sequence source synchronous data regardless of whether there was a strobe phase shift on the microprocessor bus or not.
  The ability to correctly trigger on the source synchronous data regardless of whether there was a strobe phase shift on the microprocessor bus or not.
  The ability to store the source synchronous data in a deterministic ordered manner in a logic analyzer acquisition memory, wherein the disassembly software does not have to do any post-processing of the data to reconstruct what occurred on the data bus during a data transfer, thereby avoiding software processing delays associated with reordering and filtering of the data.

What is claimed is:

1. A logic analyzer system, comprising:
   a logic analyzer;
   a probe for acquiring data signals from a bus of a device under test, said probe being located in a given location on said device under test for the duration of a given test; and
   a preprocessor;
   said preprocessor being coupled between said probe and said logic analyzer, and including:
      a circuit for detecting a strobe phase inversion condition; and
      a circuit for correcting for said strobe phase inversion condition;
   wherein said correction of said strobe phase inversion is performed in real time;
   wherein said detection and correction circuitry causes said data signals to be received at said logic analyzer in the correct order whether or not a strobe phase inversion occurred; and
   wherein said received data is source synchronous data, and said reception of said data signals in said correct order allows said logic analyzer to correctly trigger on the source synchronous data regardless of whether or not a strobe phase inversion occurred.

2. A logic analyzer system, comprising:
   a logic analyzer;
   a probe for acquiring data signals from a bus of a device under test, said probe being located in a given location on said device under test for the duration of a given test; and
   a preprocessor;
   said preprocessor being coupled between said probe and said logic analyzer, and including:
      a circuit for detecting a strobe phase inversion condition; and
      a circuit for correcting for said strobe phase inversion condition;
   wherein said correction of said strobe phase inversion is performed in real time;
   wherein said detection and correction circuitry causes said data signals to be received at said logic analyzer in the correct order whether or not a strobe phase inversion occurred; and
   wherein said detection circuitry detects that a strobe phase inversion is about to take place in a source synchronous data bus transfer by monitoring a set of sequentially clocked control signals.

3. The logic analyzer system of claim 2, wherein said source synchronous data bus transfer is a 2× source synchronous data bus transfer.

4. A logic analyzer system, comprising:
   a logic analyzer;
   a probe for acquiring data signals from a bus of a device under test, said probe being located in a given location on said device under test for the duration of a given test; and
   a preprocessor;
   said preprocessor being coupled between said probe and said logic analyzer, and including:
      a circuit for detecting a strobe phase inversion condition;
      a circuit for correcting for said strobe phase inversion condition;
      a circuit for detecting a predrive condition and generating a control signal in response thereto; and
      a circuit for filtering erroneous data resulting from said predrive condition.

5. The logic analyzer system of claim 4, wherein said correction of said strobe phase inversion and said filtering of said erroneous data are performed in real time.

6. The logic analyzer system of claim 5, wherein said strobe phase inversion detection and correction circuitry causes said data signals to be received at said logic analyzer in the correct order whether or not said strobe phase inversion occurred.

7. The logic analyzer system of claim 6, wherein said received data is source synchronous data, and said reception of said data signals in said correct order allows said logic analyzer to correctly trigger on the source synchronous data regardless of whether or not a strobe phase inversion occurred.

8. The logic analyzer system of claim 4, wherein said strobe phase inversion detection circuitry detects that a strobe phase inversion is about to take place in a source synchronous data bus transfer by monitoring a set of sequentially clocked control signals.

9. The logic analyzer system of claim 8, wherein said source synchronous data bus transfer is a 2× source synchronous data bus transfer.

* * * * *